United States Patent [19]

Grossman et al.

[11] Patent Number: 4,981,565

[45] Date of Patent: Jan. 1, 1991

[54] METHOD AND APPARATUS FOR CONTROLLING THE FLOW RATE OF MERCURY IN A FLOW SYSTEM

[75] Inventors: Mark W. Grossman, Belmont; Richard Speer, Reading, both of Mass.

[73] Assignee: GTE Products Corporation, Danvers, Mass.

[21] Appl. No.: 289,849

[22] Filed: Dec. 23, 1988

[51] Int. Cl.$^5$ .............................................. B01D 5/00
[52] U.S. Cl. .......................... 204/157.2; 204/157.21; 204/157.22; 422/186; 422/186.3
[58] Field of Search ............ 204/157.2, 157.21, 157.22; 422/186, 186.3; 250/432 P

[56] References Cited

U.S. PATENT DOCUMENTS

| | | | |
|---|---|---|---|
| 3,379,252 | 4/1983 | Work | 313/485 |
| 3,897,331 | 7/1975 | Smith et al. | 209/10 |
| 3,983,019 | 7/1976 | Botter nee Bergheaud | 204/1571 R |
| 4,514,363 | 4/1985 | Dubrin | 423/3 |
| 4,516,527 | 5/1985 | Sugioka | 118/723 |
| 4,527,086 | 7/1985 | Maya | 313/485 |
| 4,678,550 | 7/1987 | Grossman | 204/105 R |
| 4,713,547 | 12/1987 | Grossman | 250/373 |
| 4,746,832 | 5/1988 | Grossman et al. | 313/22 |

FOREIGN PATENT DOCUMENTS 281687 12/1987 European Pat. Off. .
281788 12/1987 European Pat. Off. .

OTHER PUBLICATIONS

Grossman et al., U.S. Ser. No. 815,150—Filed: 12/31/85.
Waymouth, Electric Discharge Lamps, MIT Press, (1971).
Webster and Zare, J. Phys. Chem., 85:1302, (1981).

Primary Examiner—Edward A. Miller
Assistant Examiner—Ngoclan Mai
Attorney, Agent, or Firm—Ernest V. Linek

[57] ABSTRACT

A method for increasing the mercury flow rate to a photochemical mercury enrichment utilizing an entrainment system comprises the steps of passing a carrier gas over a pool of mercury maintained at a first temperature T1, wherein the carrier gas entrains mercury vapor; passing said mercury vapor entrained carrier gas to a second temperature zone T2 having temperature less than T1 to condense said entrained mercury vapor, thereby producing a saturated Hg condition in the carrier gas; and passing said saturated Hg carrier gas to said photochemical enrichment reactor.

8 Claims, 4 Drawing Sheets

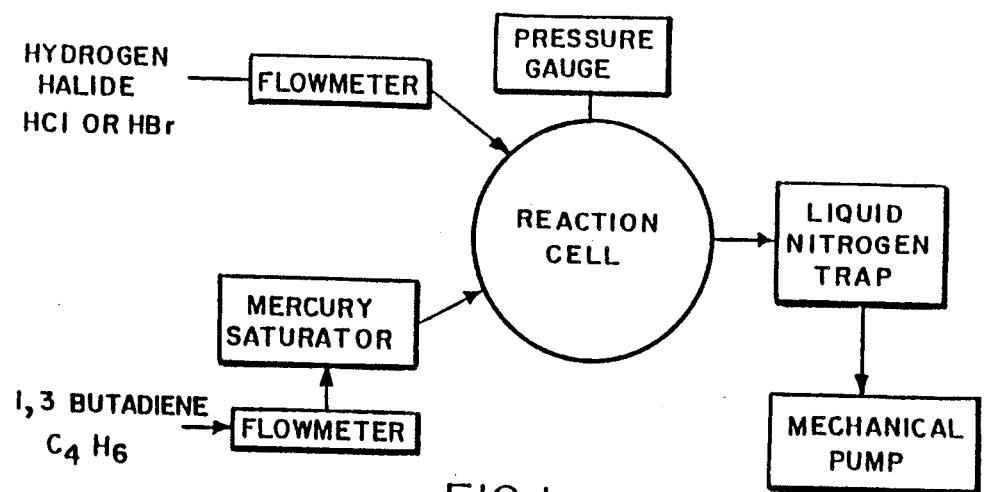
FIG. 1 PRIOR ART
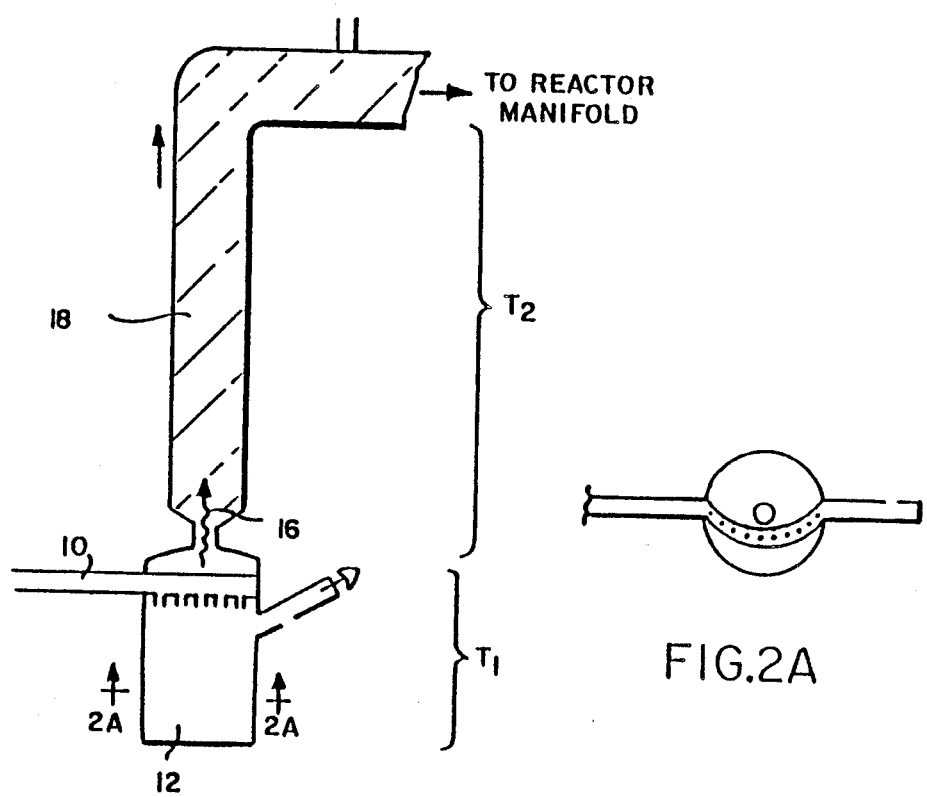
FIG. 2
FIG. 2A

METHOD AND APPARATUS FOR CONTROLLING THE FLOW RATE OF MERCURY IN A FLOW SYSTEM

STATEMENT OF GOVERNMENT INTEREST

The Government of the United States of America has rights in this invention pursuant to Subcontract 4540710 under Prime Contract DE-AC03-76SF00098 awarded by the Department of Energy.

FIELD OF THE INVENTION

The present invention is directed to a method and apparatus useful for the isotopic enrichment of a predetermined isotope of mercury (Hg) from a naturally occurring mercury mixture. While the present invention may be used to enrich any one of the seven naturally occurring isotopes of mercury ($^{202}$Hg, $^{200}$Hg, $^{199}$Hg, $^{201}$Hg, $^{198}$Hg, $^{204}$Hg, and $^{196}$Hg,) it has particularly advantageous application in the enrichment of the $^{196}$Hg isotope, which has a natural abundance of only about 0.146 percent.

BACKGROUND OF THE INVENTION

Many devices utilize mercury in their operation, particularly in the field of electric lamps and lighting. Such devices include arc discharge lamps which typically employ mercury as one of the vaporizable components therein. See, for example, Waymouth, *Electric Discharge Lamps*, MIT Press 1971 for a description of the basic operating principles of such lamps.

In U.S. Pat. No. 4,379,252, (the '252 patent) the advantages of utilizing higher than normal levels of $^{196}$Hg in the Hg added to fluorescent lamps are described and include unexpectedly high efficiency gains in light output. The disclosure of this patent is hereby incorporated herein by reference.

The drawback of using this isotope lies in its high cost. For example, using conventional enrichment techniques, mercury which has been enhanced to contain about 35% of the $^{196}$Hg isotope can cost about $500 per milligram. While only sub-milligram quantities of this isotope need by added to an incandescent lamp to afford beneficial results, economic realities always play a part in consumer products. Accordingly, it is easy to understand why more economical methods of obtaining this isotope continue to be sought.

Previously Hg entrainment methods used in the photochemical isotope separation of $^{196}$Hg employed a bubbler or sparger system filled with mercury. See for example, Webster and Zare, *J. Phys. Chem.*, 85: 1302 (1981) and FIG. 1. This method has been found to have several disadvantages, particularly at mercury flow rates of 1 g/hr. or higher. The upstream pressure would vary during the bubbling and cause height reduction of the mercury column in the bubbler. Mechanical motion of small droplets necessitated an extended transition of vacuum tubing between the reactor and the bubbler. Given the extended transition region, control of the vapor pressure of mercury is difficult.

The following additional documents are recited as general background information with respect to the subject matter of the present invention. To the extent deemed necessary by artisans of ordinary skill in the art to which this invention pertains, the teachings of these documents are hereby incorporated herein by reference.

Grossman, U.S. Pat. No. 4,713,547;
Grossman et al., U.S. Pat. No. 4,678,550;
Maya, U.S. Pat. No. 4,527,086;
Durbin, U.S. Pat. No. 4,514,363;
Work et al., U.S. Pat. No. 3,379,252;
Botter nee Bergheaud et al., U.S. Pat. No. 3,983,019;
Smith et al., U.S. Pat. No. 3,897,331;
Grossman et al., U.S. Ser. No. 815,150, filed Dec. 31, 1985;
European Patent Publication No. 0 281 687, published Sept. 14, 1988, claiming priority of U.S. Ser. No. 947,217, filed Dec. 29, 1986; and
European Patent Publication No. 0 280 788, published Sept. 7, 1988, claiming priority of U.S. Ser. No. 947,216, filed Dec. 29, 1986.

SUMMARY OF THE INVENTION

The present invention is directed to a mercury entrainment device and reactor system which accurately control the flow (rate) of the mercury in a mercury photochemical enrichment system. Measurements indicate good agreement with the simple plug flow and perfect entrainment model described herein.

The present invention is thus directed to an improved photochemical process and apparatus useful for the enrichment of a predetermined mercury isotope from a naturally occurring mercury mixture of isotopes, particularly the enrichment of the $^{196}$Hg isotope.

The compact Hg delivery systems of the present invention may be used for from 1 g/hr. up to from about 10 to 20 g/hr. photochemical processes. Unlike previous designs, the apparatus of the present invention uses a two temperature zone photoreactor tube.

It has also been discovered that by changing the ambient temperature of a mercury transport system the mercury flow rate can be controlled. In particular, increasing the ambient temperature from 25° to 40° increases the mercury flow rate by a factor of 3.5.

BRIEF DESCRIPTION OF THE DRAWINGS

FIG. 1 is a schematic of the mercury photochemical separation apparatus of Webster and Zare, *J. Phys. Chem.*, 85: 1302–1305 (1981).

FIGS. 2 and 2A illustrate the preferred two-temperature zone mercury entrainment vessel of the present invention, which replaces Webster and Zare's mercury saturator in FIG. 1.

DETAILED DESCRIPTION OF THE PREFERRED EMBODIMENTS

Figure 3:
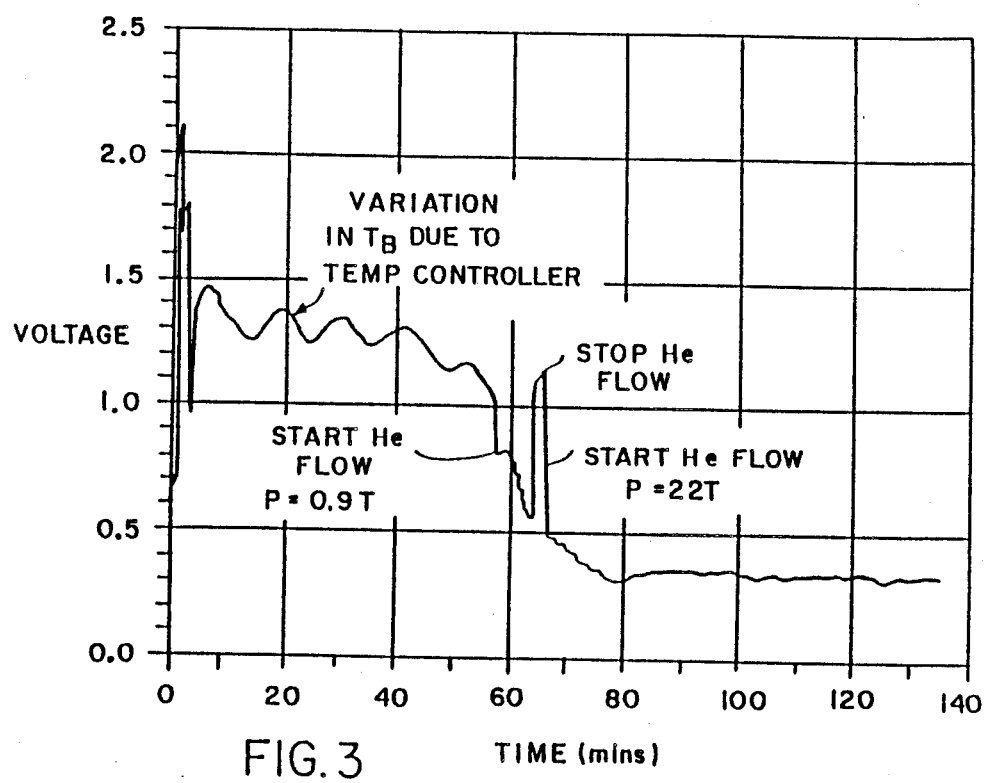
FIG. 3 shows the variation of transmitted U.V. radiation as a function of time.

The mercury flow rate, Q is a key parameter in high throughput $^{196}$Hg isotope separation systems. See, for example, Grossman et al., U.S. Pat. No. 4,713,547 (the '547 patent), the disclosure of which is hereby incorporated herein by reference.

The quantity Q is directly related to the $^{196}$Hg enrichment, E, the $^{196}$Hg feedstock utilization U, and the product yield Y as follows:

$$Y = (QU)/E \tag{1}$$

This is true for time and spatial averaged quantities. These quantities are defined in more detail below, especially with regard to their applicability to the photochemical enrichment of $^{196}$Hg. See, Equations (7)-(10) infra.

As can be seen from Equation 1, the product yield is directly proportional to Q. Since it is known that the maximum possible value of U is 1.0 and the minimum acceptable value of E is about 17, the only way to increase Y given these optimum values of U and E is to increase Q, the flow rate. Thus the eventual "scaling up" of any given mercury enrichment process depends on the ability to increase Q.

In the apparatus of the present invention, (shown in FIGS. 2 and 2A) a carrier gas 10 entering from one side, is directed onto a pool of Hg 12 located in a first temperature zone 14, maintained at temperature T$_1$. The carrier gas entrains Hg vapor 16 and carries it up into a second temperature zone 18, maintained at a second temperature, T$_2$. Preferably, T$_1$>T$_2$.

In zone 18, the Hg vapor 16 is condensed until a saturated condition exists at T$_2$. This zone is advantageously filled with glass tubing e.g., 5×7 mm×10 mm to allow the condensed Hg to be held in place and to run back to the T$_1$ region.

The first, or "hot" zones 14 provides a large flux of Hg to be entrained by the carrier gas and the second, or "cold" zone 18, fixes the mercury density. Thus a saturated or nearly saturated carrier gas stream may be fed to a conventional photochemical mercury enrichment reactor (See FIG. 1).

The apparatus of the present invention allows for much larger levels of Q than previously available. Moreover, this entrainment system produces very little conductance drop across the mercury supply in distinction to the system used by Webster and Zare, supra.

Furthermore, by use of heating means (not illustrated), such as an oven or heating tape, T$_1$ can be accurately controlled thus producing a known Hg density just downstream of the entrainment system.

Measurement of the transmitted U.V. radiation implies a good correlation between the cold zone temperature and the mercury density. Condensation measurements of Hg density are also in agreement with predicted Hg density.

FIG. 3 shows the variation of transmitted U.V. radiation as a function of time. During the time t=5 min. the oscillatory U.V. transmission tracked 2° to 3° C. changes in T$_1$.

In order to maximize Q, Webster and Zare, supra, utilized a heated mercury pool over which one of the reactants passed. By increasing the local density, the amount of Hg vapor entrained by the streaming gas was thought to be increased. However, using a similar gas introduction system, it has been found that merely raising the Hg reservoir temperature alone does not appreciably effect the Hg flow rate. See, Examples 7 and 8 in Table 1.

On the other hand, Examples 1 and 2 and Examples 4 and 6 in Table 1 clearly demonstrate that by increasing the ambient temperature of the reactor one can increase the Hg flow rate. This technique permits high Hg throughput compared to other Hg photochemical enrichment processes. For example, Webster and Zare achieved Y=2.5 mg/hr., E=4.2 and U=0.22 which gives a Hg flow rate of:

Q=(EU)/U=48 mg/hr.

Their total pressure was 3 Torr and the flow rate of the entraining gas was 277 sccm.

As shown in Table 1 the process of the present invention achieves much higher Hg flow rates than those previously reported by Webster and Zare, supra.

TABLE 1

| Example Number | Carrier Gas | P$_{TOT}$ (Torr) | Q$_{Hg}$ (mg/hr.) | T$_a$ °C. |
|---|---|---|---|---|
| | | 1 cm gap | | |
| 1 | He | 2.4 | 178 | 25 |
| 2 | He | 2.4 | 624 | 40 |
| | | 3 cm gap | | |
| 3 | He | 1.2 | 1221 | 40 |
| 4 | He | 2.4 | 444 | 39 |
| 5 | He | 4.9 | 249 | 40 |
| 6 | He | 2.4 | 201 | 25 |
| | | 1 cm gap | | |
| 7 | He | 1.2 | 360 | 25 (Bubbler Temp. 50° C.) |
| 8 | He | 1.2 | 348 | 25 |

By analyzing basic Hg transport mechanisms it has been discovered that it is possible to greatly increase the Hg throughput and thereby make achieve a substantial increase in the yield of mercury enriched in the $^{196}$Hg isotope.

The basis of the Hg transport lies in two model assumptions known as "perfect entrainment" and "plug" flow conditions that exist for the Hg feedstock.
The following terms are thus defined:

V$_{Hg}$ = velocity of mercury vapor
V$_{Gas}$ = velocity of carrier gas
Q$_{Hg}$ = mercury flow rate
Q$_{Gas}$ = carrier gas flow rate
N$_{Hg}$ = mercury vapor density
N$_{Gas}$ = carrier gas density
P$_{Hg}$ = mercury vapor pressure
P$_{Gas}$ = gas pressure
A = cross-sectional area of reactor through which gas and vapor flows For perfect entrainment:

$$V_{Hg} = V_{Gas} \quad (2)$$

For plug flow:

$$Q_{Hg} = N_{Hg} V_{Hg} A \quad (3)$$

and $$Q_{Gas} = N_{Gas} V_{Gas} A \quad (4)$$

Using equations (2), (3), and (4) implies that the mercury flow rate is given by:

$$Q_{Hg} = (N_{Hg} Q_{gas})/N_{gas} \quad (5)$$

or $$Q_{Hg} = (Q_{gas}/P_{Hg})/P_{gas} \quad (6)$$

Equation (6) implies that for P$_{Hg}$ and Q$_{gas}$ fixed, Q$_{Hg}$ varies as 1/P$_{gas}$. It is noted, however, that P$_{Hg}$ could have a value controlled independently of Q$_{Hg}$ of Q$_{gas}$, and P$_{gas}$ due to the fact that it is a condensable gas. On the other hand, Q$_{gas}$ and P$_{gas}$ are directly measurable and independently controllable variables and Q$_{Hg}$ is directly measurable. Thus by plotting Q$_{Hg}$ versus Q$_{gas}$/-

$P_{gas}$ and utilizing a linear least square fit of the data $P_{Hg}$ can be obtained if $P_{Hg}$ is a constant.

Figure 4:
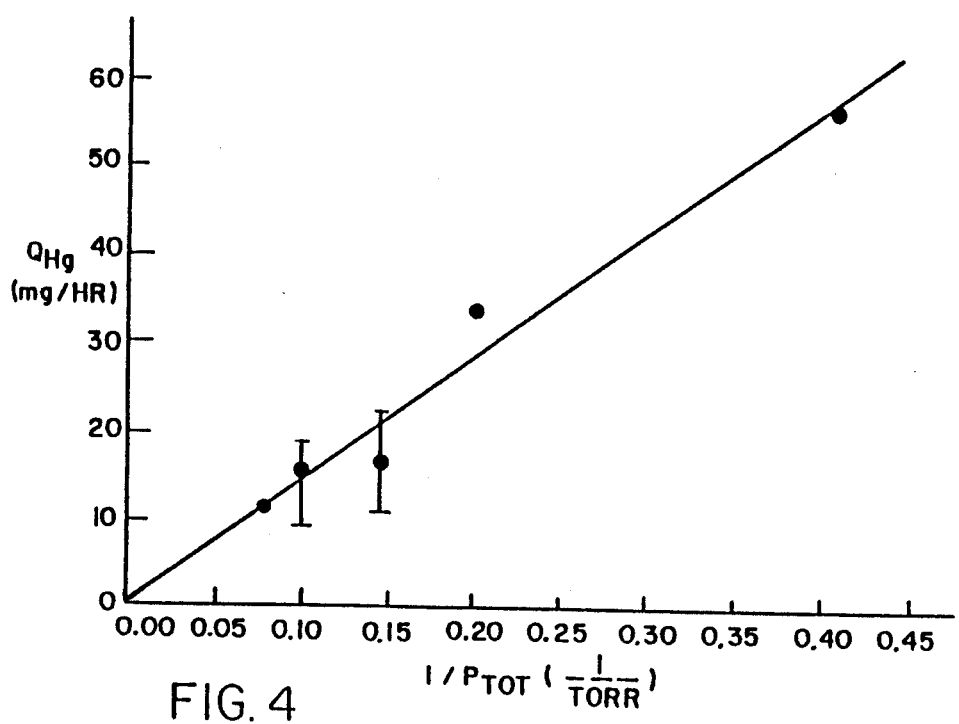
FIGS. 4, 5, and 6 are examples of plots wherein by plotting $Q_{Hg}$ versus $Q_{gas}/P_{gas}$ and utilizing a linear least square fit of the data, $P_{Hg}$ can be obtained.
Figure 5:
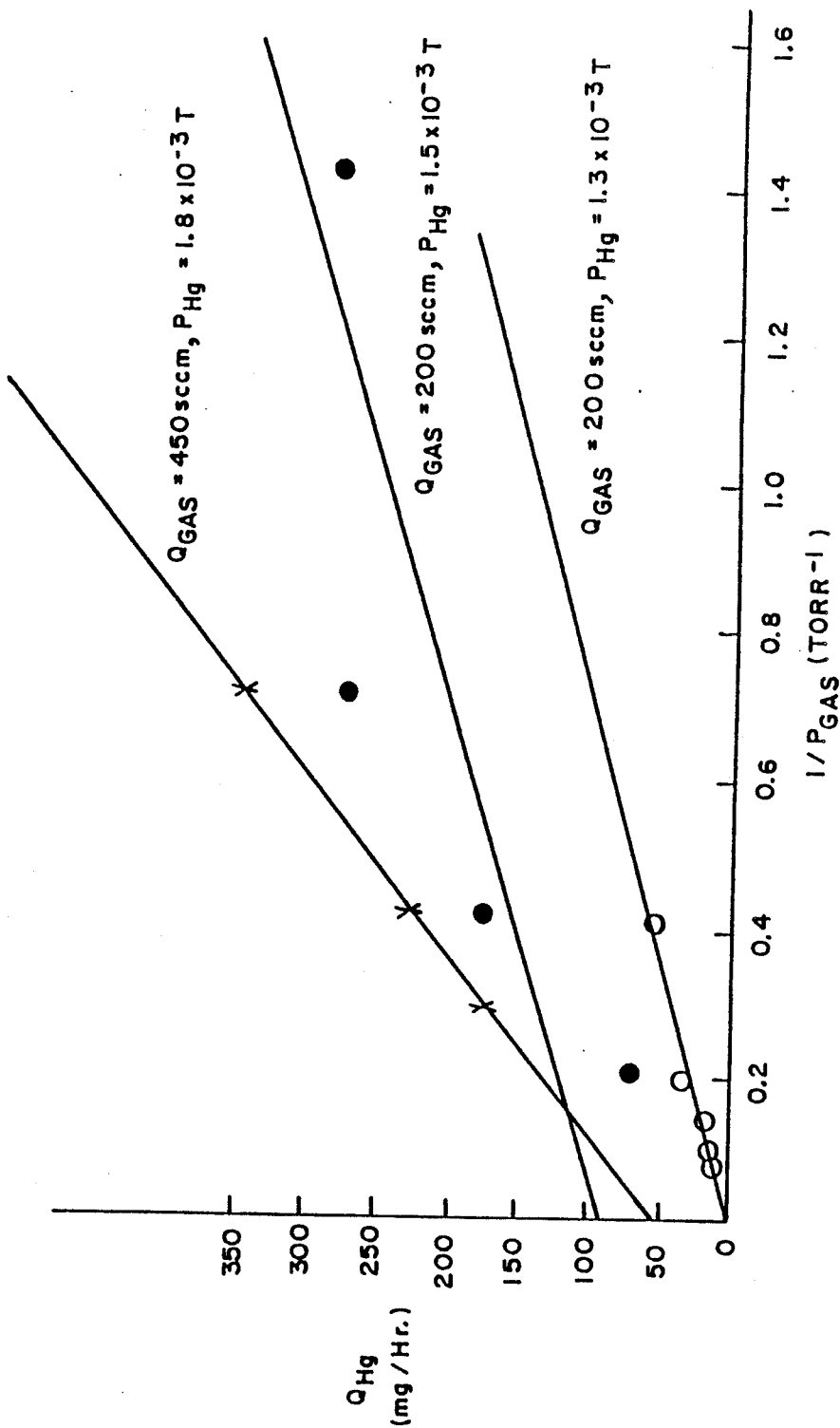
Figure 6:
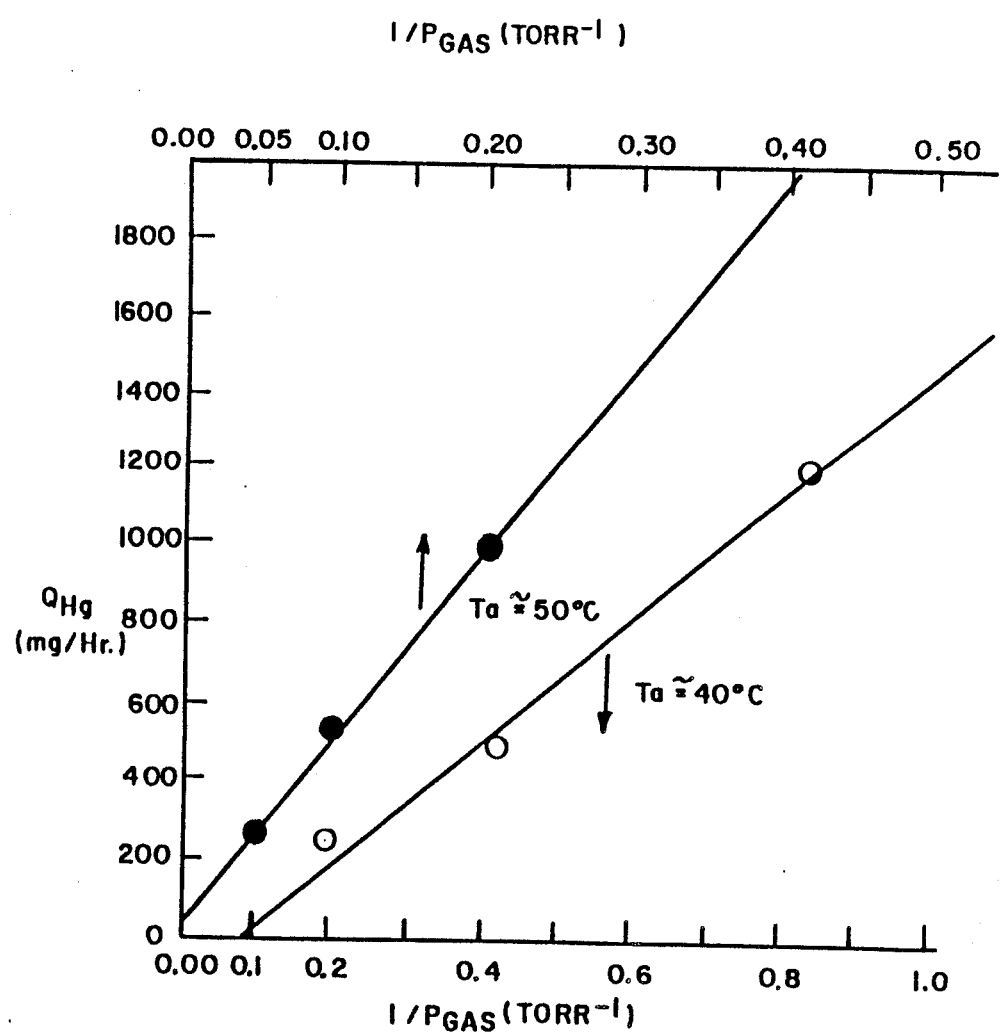

FIGS. 4, 5, and 6 are examples of these plots. The set of data from FIG. 4 is shown in FIG. 5 with other data. Here the ambient temperature is about 23° C. and thus one would expect an Hg density of about $1.5 \times 10^{-3}$ Torr if the pressure correspond to the Hg liquid-vapor saturation pressure. The values determined from the data are quite close to this.

Table 2 shows the data plotted for FIG. 6. In these two cases the ambient temperature was raised to about 40° C. and about 50° C. The expected mercury liquid vapor saturation pressure is $6.1 \times 10^{-3}$ Torr and $12.7 \times 10^{-3}$ Torr. The predicted values shown in Table 2 are quite close to these values. It should also be noted that a fairly consistent linearity was observed in the plotted data. Taken together the data implies that equations (2) and (6) form a reasonable description of the Hg transport through the flow system, and that the average mercury density is determined by the liquid vapor saturation temperature.

TABLE 2

| Example | P (Torr) | $Q_{gas}$ (sccm) | 1/P (Torr$^{-1}$) | $Q_{Hg}$ mg/hr. | y = a + bx | | $P_{Hg}$ (Torr) |
|---|---|---|---|---|---|---|---|
| | | | | | a | b | |
| $T_{AMBIENT} \sim 50°$ C. | | | | | | | |
| 9 | 5.0 | 700 | 0.20 | 1000 | | | |
| 10 | 10.0 | 700 | 0.10 | 530 | | | |
| 11 | 20.0 | 700 | 0.05 | 260 | | | |
| | | | | | 25 | 4900 | $13.1 \times 10^{-3}$ |
| $T_{AMBIENT} \sim 40°$ C. | | | | | | | |
| 12 | 1.2 | 450 | 0.83 | 1221 | | | |
| 13 | 2.4 | 450 | 0.42 | 444 | | | |
| 14 | 4.9 | 450 | 0.20 | 249 | | | |
| | | | | | −129 | 1540 | $6.6 \times 10^{-3}$ |

$P_{Hg} = b(1/Q_{TOT}) \times 1.87 \times 10^{-3}$
NOTE:
1 mg/hr. Hg = $>1.87 \times 10^{-3}$ sccm Hg Applying the above principles to the photochemical enrichment of $^{196}$Hg entails further refinement of the above described equations. Thus, the following space and time averaged quantities must also be defined to aid in the understanding of the present invention:
$E_{FI}$ = Enrichment Factor
$U_I$ = Feedstock Utilization
$Y_I$ = Yield (mg/hr.)
$Q_I$ = Feedstock Flow Rate (mg/hr.)
$F_I$ = Effluent Flow Rate (mg/hr.)
wherein the subscript "I" refers to the Ith isotope. From the above, the following relationships may be derived:

$$E_{FI} = (Y_I/Y)/(Q_I/Q), \text{ where } Y = \sum_I Y_I \quad (7)$$

For example, $$Y = Y_1 = Y_{196} + Y_{198} + Y_{199} + Y_{200} + Y_{201} + Y_{202} + Y_{204}$$

$$U_I = Y_I/Q_I \text{ and } F_I = Q_I - Y_I$$

$$U_I = (Q_I - F_I)/Q_I = 1 - (F_I/Q)/(Q_I/Q) \quad (8)$$

For cases of interest Y << Q and $$U_I = 1 - (F_I/F)/(Q_I/Q) \quad (9)$$

Also $$Y = (U_I Q)/E_{FI} \quad (10)$$

The fraction of $^{196}$Hg in the effluent $F_I/F$ is measured and $Q_I/Q$ is the known feedstock concentration of $^{196}$Hg, then using equation (9) the utilization of $^{196}$Hg is determined. Q is measured by accumulating the effluent for a fixed time and determining the Hg content via titration for small Hg quantities (<100 mg) or by direct weighing of the Hg bead ($\geq$100 mg).

Here use is made of the fact that Y << Q so that:

$$F_I = Q_I$$

The enrichment factor is determined by mass spectochemical product. See, Grossman et al., U.S. Ser. No. 815,150, filed Dec. 31, 1985, the disclosure of which is hereby incorporated herein by reference. Using equation (10) then gives the yield Y.

This has been verified for low yield conditions by careful electrolytic separation of all the Hg from the product and thereafter measuring each of the four quantities shown in equation (10). The results of these measurements are shown in Table 3.

TABLE 3

| Y mg/hr. | Q ($U_{196}/E_{196}$) mg/hr. |
|---|---|
| 0.36 | 0.68 |
| 0.51 | 0.58 |
| 0.33 | 0.34 |
| 0.44 | 0.65 |

The present invention has been described in detail, including the preferred embodiments thereof. However, it will be appreciated that those skilled in the art, upon consideration of the present disclosure, may make modification and/or improvements on this invention and still be within the scope and spirit of this invention as set forth in the following claims.

What is claimed is:

1. In a mercury entrainment system for use with a photochemical mercury enrichment reactor, said entrainment system utilizing a temperature regulated pool of mercury, a bubbler or sparger system, and a carrier gas for entraining mercury vapor;

the improvement comprising: means for increasing the flow of mercury to said reactor comprising a two temperature zone entrainment apparatus, said apparatus comprising a heated mercury pool situated in a first temperature zone at temperature $T_1$, through which the carrier gas passes and entrains mercury, and a second temperature zone, maintained at a temperature $T_2$, wherein $T_1 > T_2$, said second temperature zone containing a packing material on which the mercury is condensed, thereby creating a saturated Hg condition in the carrier gas in said second temperature zone which saturated gas is passed to a mercury enrichment reactor.

2. The mercury entrainment system of claim 1, which further comprises adjustable heating means for controlling either or both of the temperature zones $T_1$ and $T_2$.

3. The mercury entrainment system of claim 1, which is used for photochemical mercury enrichment processes for a feedstock flow of at least 1 g/hr.

4. The mercury entrainment system of claim 1, which is used for photochemical mercury enrichment processes for a feedstock flow of at from about 10 to 20 g/hr.

5. The mercury entrainment system of claims 1, 2, 3, or 4, wherein the mercury isotope of interest is $^{196}$Hg.

6. A process for increasing the mercury flow rate $Q_{Hg}$ to a photochemical mercury enrichment process comprising the steps of:
   (a) utilizing an entrainment system having a temperature regulated pool of mercury, a bubbler or sparger system, and a carrier gas for entraining mercury vapor;
   (b) passing the carrier gas over a pool of mercury maintained at a first temperature, $T_1$, wherein the carrier gas entrains mercury vapor; and
   (c) passing said mercury vapor entrained carrier gas to a second temperature zone, maintained at a temperature $T_2$, such that $T_2$ is less than $T_1$, in which the entrained mercury vapor is condensed, thereby producing a saturated Hg condition in the carrier gas; and
   (d) passing said saturated Hg carrier gas to said photochemical enrichment reactor, yielding a high flow rate $Q_{Hg}$;
which process satisfies the following equations:

$$Y = (Q_{Hg} U)/E \qquad (1)$$

$$V_{Hg} = V_{Gas} \qquad (2)$$

$$Q_{Hg} = N_{Hg} V_{Hg} A \qquad (3)$$

$$Q_{Gas} = N_{Gas} V_{Gas} A \qquad (4)$$

$$Q_{Hg} = (N_{Hg} N_{Gas})/Q_{Gas} \qquad (5)$$

or $$Q_{Hg} = Q_{Gas}/(P_{Hg Gas}) \qquad (6)$$

wherein:
Y = yield of $^{196}$Hg
E = enrichment of $^{196}$Hg
U = feedstock utilization
$V_{Hg}$ = velocity of mercury vapor
$V_{Gas}$ = velocity of carrier gas
$Q_{Hg}$ = mercury flow rate
$Q_{Gas}$ = carrier gas flow rate
$N_{Hg}$ = mercury vapor density
$N_{Gas}$ = carrier gas density
$P_{Hg}$ = mercury vapor pressure
$P_{Gas}$ = gas pressure
A = cross-sectional area of reactor through which gas and vapor flows.

7. The process of claim 6, wherein the temperature of the reactor environment is raised to about 40° C.

8. The process of claim 6, wherein the temperature of the reactor environment is raised to about 50° C.

* * * * *